(12) United States Patent
Sakaguchi et al.

(10) Patent No.: US 10,236,491 B2
(45) Date of Patent: Mar. 19, 2019

(54) LITHIUM ION SECONDARY BATTERY

(71) Applicant: Automotive Energy Supply Corporation, Zama-shi, Kanagawa (JP)

(72) Inventors: Shinichiro Sakaguchi, Zama (JP); Aika Kimura, Zama (JP); Masatomo Mizuta, Zama (JP)

(73) Assignee: AUTOMOTIVE ENERGY SUPPLY CORPORATION, Kanagawa (JP)

( * ) Notice: Subject to any disclaimer, the term of this patent is extended or adjusted under 35 U.S.C. 154(b) by 0 days.

(21) Appl. No.: 15/053,025

(22) Filed: Feb. 25, 2016

(65) Prior Publication Data

US 2016/0285065 A1 Sep. 29, 2016

(30) Foreign Application Priority Data

Mar. 25, 2015 (JP) .................... 2015-062114

(51) Int. Cl.
*H01M 2/02* (2006.01)
*H01M 2/14* (2006.01)
(Continued)

(52) U.S. Cl.
CPC ............. *H01M 2/18* (2013.01); *H01M 2/021* (2013.01); *H01M 2/0207* (2013.01);
(Continued)

(58) Field of Classification Search
CPC ......... H01M 10/0525; H01M 10/0585; H01M 2/0207; H01M 2/021; H01M 2/0237; H01M 2/0275; H01M 2/14; H01M 2/18
See application file for complete search history.

(56) References Cited

U.S. PATENT DOCUMENTS

2011/0143183 A1 6/2011 Matsumoto et al.
2011/0151307 A1* 6/2011 Hwang ................. H01M 2/021
429/129
(Continued)

FOREIGN PATENT DOCUMENTS

CN 102124591 A 7/2011
CN 104106155 A 10/2014
(Continued)

OTHER PUBLICATIONS

Extended European Search Report dated Apr. 14, 2016 issued in corresponding European Patent Application No. 16157356.3.

*Primary Examiner* — Sarah A. Slifka
*Assistant Examiner* — Lilia Nedialkova
(74) *Attorney, Agent, or Firm* — Troutman Sanders LLP

(57) ABSTRACT

A lithium ion secondary battery includes: an electrode multilayer body including a plurality of electrodes stacked with a plurality of separators interposed therebetween; and a package. An end of each of the plurality of separators of the electrode multilayer body housed in the package projects from each of the plurality of electrodes. The plurality of separators includes a first separator, and a second separator which is disposed inside of the first separator and whose projecting amount of an end is smaller than that of the first separator. The end of the first separator is in contact with an inner surface of the packaging film or an inner surface of the separator located outside of the first separator, the end of the first separator is curved further inside than a virtual extension plane of an outer surface of the second separator.

4 Claims, 5 Drawing Sheets

(51) Int. Cl.
   *H01M 2/18*   (2006.01)
   *H01M 10/0525*   (2010.01)
   *H01M 10/0585*   (2010.01)

(52) U.S. Cl.
   CPC ....... *H01M 2/0237* (2013.01); *H01M 2/0275* (2013.01); *H01M 2/14* (2013.01); *H01M 10/0525* (2013.01); *H01M 10/0585* (2013.01)

(56) References Cited

U.S. PATENT DOCUMENTS

| | | | | |
|---|---|---|---|---|
| 2011/0287301 | A1* | 11/2011 | Kim | H01M 2/18 429/160 |
| 2014/0205887 | A1* | 7/2014 | Tanjo | H01M 2/0212 429/149 |
| 2014/0349169 | A1 | 11/2014 | Mizuno et al. | |
| 2015/0050542 | A1 | 2/2015 | Mizuno et al. | |
| 2015/0056492 | A1* | 2/2015 | Huang | H01M 2/145 429/145 |

FOREIGN PATENT DOCUMENTS

| | | | | |
|---|---|---|---|---|
| CN | 104205416 | A | 12/2014 | |
| EP | 2747167 | A1 | 6/2014 | |
| JP | 2009277397 | A | 11/2009 | |
| JP | WO 2013047778 | A1 * | 4/2013 | ............ H01M 10/04 |

* cited by examiner

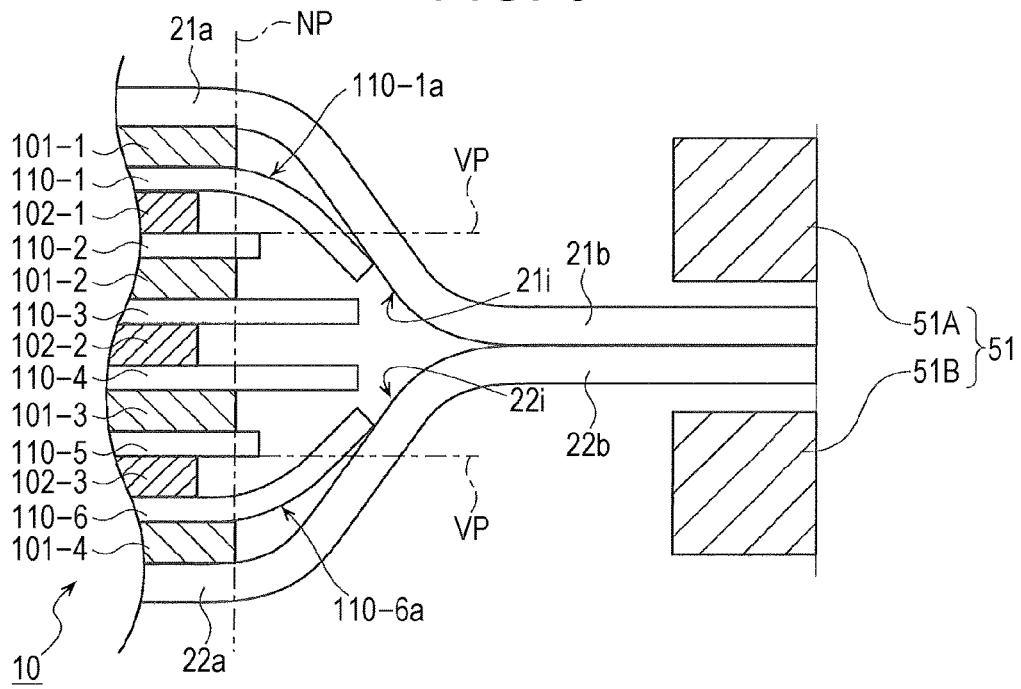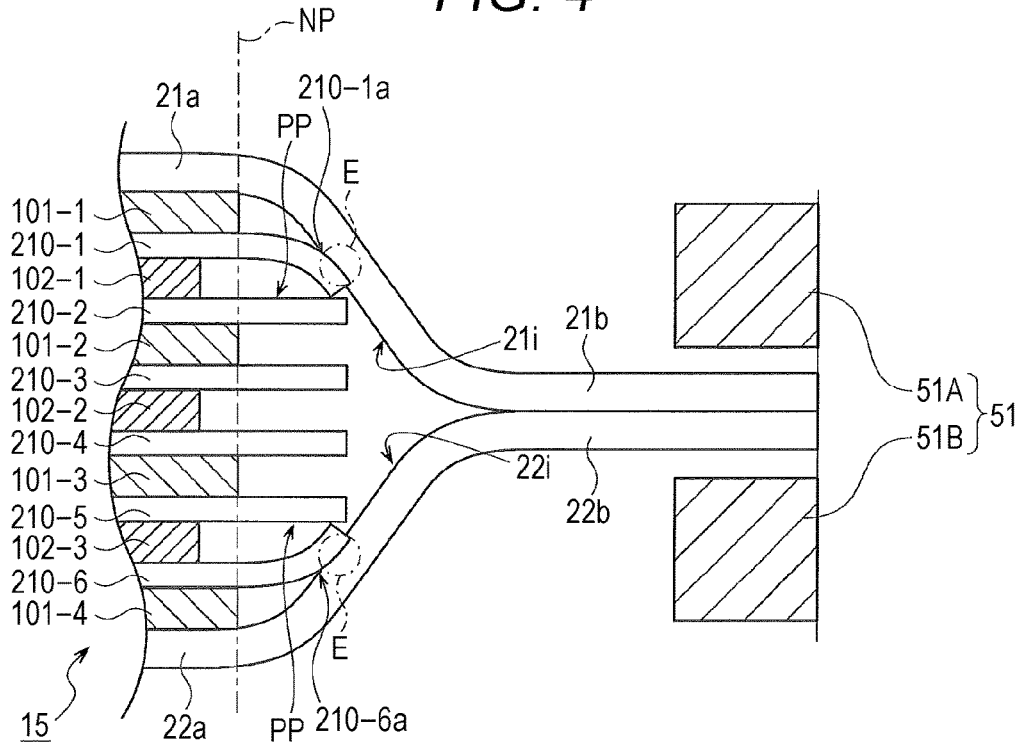

LITHIUM ION SECONDARY BATTERY

CROSS-REFERENCE TO RELATED APPLICATION

This application claims priority from Japanese Patent Application No. 2015-062114 filed with the Japan Patent Office on Mar. 25, 2015, the entire content of which is hereby incorporated by reference.

BACKGROUND

1. Technical Field

The present disclosure relates to a lithium ion secondary battery.

2. Related Art

Lithium ion secondary batteries are typically required to prevent the short-circuiting between positive and negative electrodes for sure even in the occurrence of the thermal contraction of a separator held between the positive and negative electrodes or the displacement of the separator relative to the electrode. For this reason, the separator is designed to have a larger area than the positive and negative electrodes. On the other hand, another known lithium ion secondary battery includes a separator with high heat resistance (hereinafter referred to as "heat-resistant separator"). For example, JP-A-2009-277397 has disclosed a lithium ion secondary battery in which a positive electrode and a negative electrode are stacked with a separator interposed therebetween. This separator includes at least a microporous film layer mainly formed of thermoplastic resin, and a porous layer mainly including filler with a heat resistance temperature of 150° C. or more. Since the heat-resistant separator does not contract that much under high temperature, the internal shot-circuiting between the positive and negative electrodes can be suppressed. For this reason, it has been known that the lithium ion secondary battery with the heat-resistant separator has relatively high safety.

SUMMARY

A lithium ion secondary battery according to one aspect of the present disclosure includes: an electrode multilayer body including a plurality of positive electrodes and negative electrodes stacked with a plurality of heat-resistant separators interposed therebetween; and a package including a packaging film that covers the electrode multilayer body from both sides in a stacking direction. The package includes a region for sealing the package, the region being on the packaging film that covers the electrode multilayer body around the electrode multilayer body. An end of each of the plurality of separators projects from each of the plurality of positive electrodes and negative electrodes. The plurality of separators includes a first separator, and a second separator which is disposed inside the first separator and whose projecting amount of an end is smaller than that of the first separator. The end of the first separator is in contact with an inner surface of the packaging film or an inner surface of the separator located outside the first separator, the end of the first separator including a curved portion that is curved further inside than a virtual extension plane of an outer surface of the second separator.

BRIEF DESCRIPTION OF DRAWINGS

FIG. 3 is a sectional view illustrating the section along A-A in FIG. 2 with a heating head;

FIG. 4 is a sectional view of a lithium ion secondary battery according to another embodiment, which illustrates the cross section corresponding to FIG. 3;

DETAILED DESCRIPTION

Figure 1:
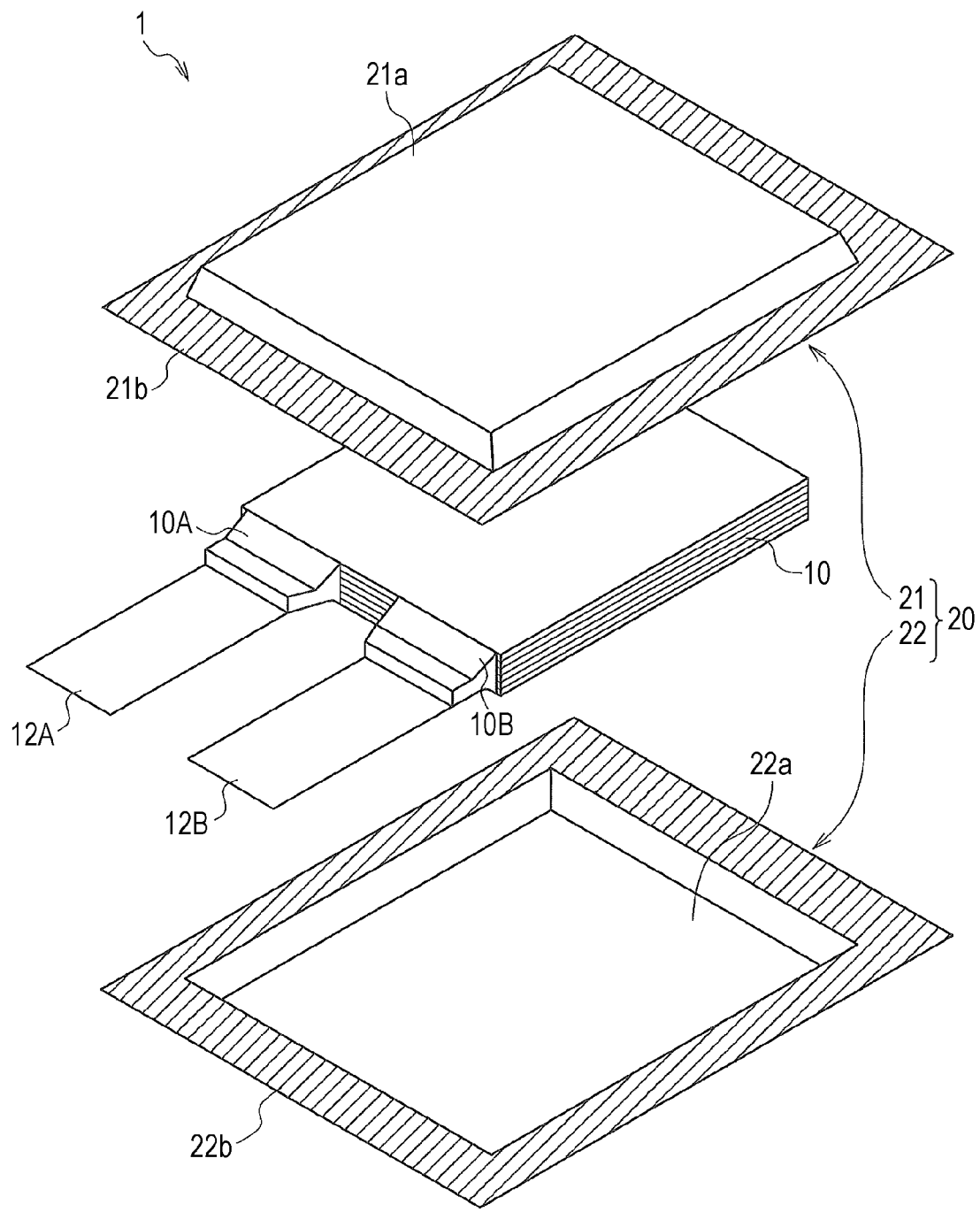
FIG. 1 is an exploded perspective view of a lithium ion secondary battery according to an embodiment.

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

For fabricating a lithium ion secondary battery with a heat-resistant separator, a packaging film housing an electrode multilayer body is heat-sealed. The electrode multilayer body includes a plurality of positive electrodes and negative electrodes stacked with a plurality of heat-resistant separators interposed therebetween. In the heat-sealing, the present inventors have discovered that the inner surface of the packaging film is damaged by an end of the heat-resistant separator. The packaging film has a structure in which an inner layer as a heat-sealing resin layer, a metal layer as a barrier layer, and an outer layer as a protective layer are stacked. When the inner surface of the packaging film is damaged, the heat-resistant separator possibly reaches the metal layer of the packaging film, in which case the insulating property of the metal layer may be lost. In this case, the lithium ion secondary battery may fail to deliver the desired performance. In addition, in the case where the battery size is set within a certain range (i.e., the external shape of the battery is set so that the battery can be housed in the packaging film with a certain size), the positive electrode, the heat-resistant separator, and the negative electrode need to be reduced in size in order to prevent the end of the heat-resistant separator from touching the packaging film. This is disadvantageous because the size reduction leads to the smaller capacity.

In view of the above, an object of the present disclosure is to suppress the deterioration in performance of the battery caused by the heat-resistant separator used for a lithium ion secondary battery.

A lithium ion secondary battery according to one aspect of the present disclosure includes: an electrode multilayer body including a plurality of positive electrodes and negative electrodes stacked with a plurality of heat-resistant separators interposed therebetween; and a package including a packaging film that covers the electrode multilayer body from both sides in a stacking direction. The package includes a region for sealing the package, the region being on the packaging film that covers the electrode multilayer body around the electrode multilayer body. An end of each of the plurality of separators projects from each of the plurality of positive electrodes and negative electrodes. The plurality of separators includes a first separator, and a second separator which is disposed immediately inside the first separator (at a position closer to the first separator than any other separator disposed inside the first separator) and whose projecting amount of an end is smaller than that of the first separator. The end of the first separator is in contact with an inner surface of the packaging film or an inner surface of the separator located immediately outside the first separator (at a position closer the first separator than any other separator disposed outside the first separator), the end of the first separator including a curved portion that is curved further inside than a virtual extension plane of an outer surface of the second separator.

Here, "inside" refers to "being closer to the center of the electrode multilayer body in the stacking direction" and "outside" refers to "being farther from the center the electrode multilayer body in the stacking direction". "Inner surface of separator" refers to "a major surface of the separator that is closer to the center of the electrode multilayer body in the stacking direction". "Outer surface of separator" refers to "a major surface of the separator that is farther from the center of the electrode multilayer body in the stacking direction".

In the lithium ion secondary battery, an end of the first separator is preferably in plane contact with the inner surface of the packaging film or the inner surface of the separator on the outside of the first separator.

In the lithium ion secondary battery according to the present disclosure, the deterioration in performance of the battery caused by the heat-resistant separator used for the battery can be suppressed.

An embodiment of the present disclosure is described below.

(1) Lithium Ion Secondary Battery According to Embodiment

Figure 2:
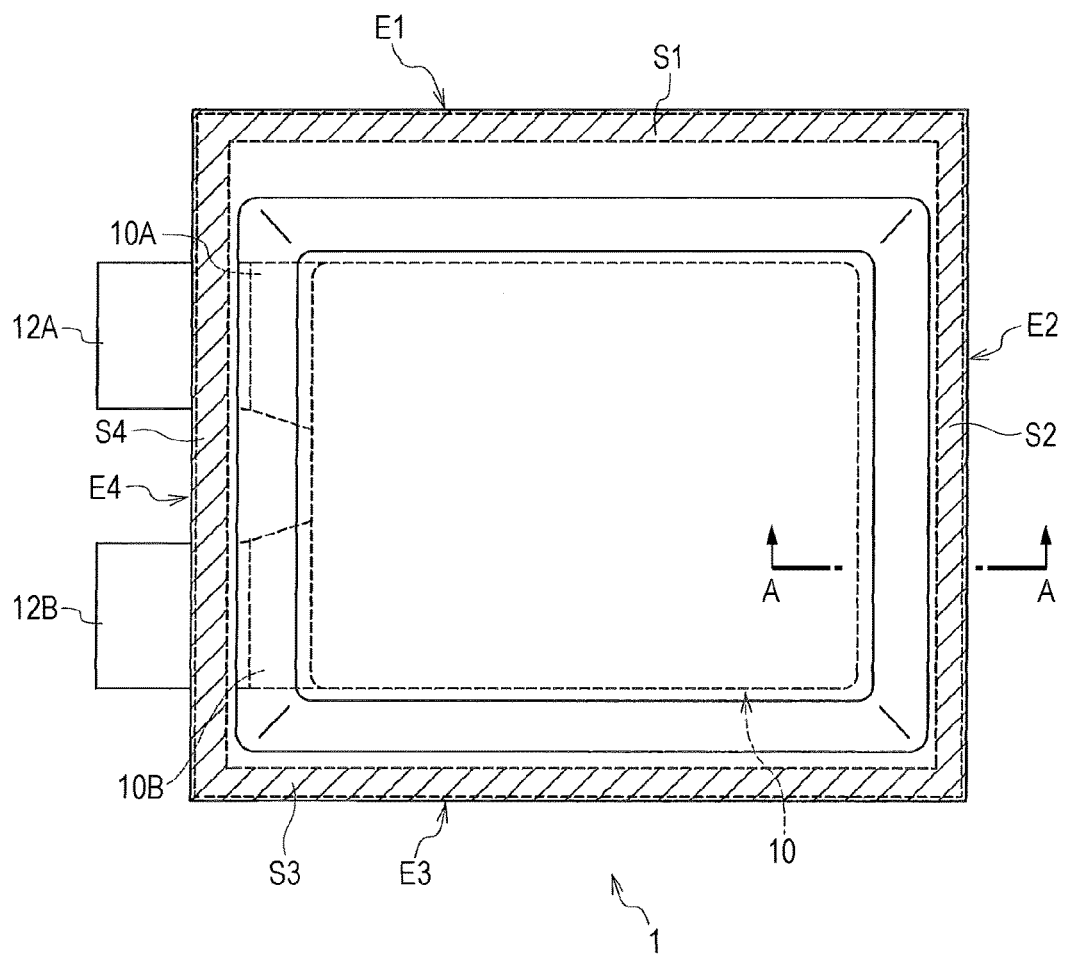
FIG. 2 is a plan view of the lithium ion secondary battery according to the embodiment.

Description is hereinafter made of a lithium ion secondary battery according to an embodiment of the present disclosure with reference to FIGS. 1 to 3. FIG. 1 is an exploded perspective view of a lithium ion secondary battery 1 according to this embodiment. FIG. 2 is a plan view of the lithium ion secondary battery 1 according to the embodiment. FIG. 3 is a sectional view illustrating the section along A-A in FIG. 2 with a heating head. As described below, the heating head is included in a heating apparatus for bonding the packaging films to each other around an electrode multilayer body 10 of the lithium ion secondary battery 1.

In FIG. 1, the lithium ion secondary battery 1 according to the embodiment includes the electrode multilayer body 10, a positive electrode tab 12A, a negative electrode tab 12B, and a package 20. The electrode multilayer body 10 has an approximately rectangular parallelepiped shape, and includes a plurality of positive electrodes and negative electrodes stacked with a plurality of separators interposed therebetween. The positive electrode tab 12A and the negative electrode tab 12B are connected to a positive electrode lead 10A and a negative electrode lead 10B, respectively. The positive electrode lead 10A and the negative electrode lead 10B are led out of the positive electrode and the negative electrode of the electrode multilayer body 10, respectively. The package 20 is sealed around the electrode multilayer body 10 housed in the package. A part of the positive electrode tab 12A and a part of the negative electrode tab 12B are extended out of the sealed package 20. In the example illustrated in FIG. 1, a part of the positive electrode tab 12A and a part of the negative electrode tab 12B are led from one side of the electrode multilayer body 10.

The electrode multilayer body 10 of the lithium ion secondary battery 1 in this embodiment is formed by stacking the positive electrode and the negative electrode with the separator interposed therebetween. The positive electrode includes a current collector on which a positive electrode mixture layer including a positive electrode active material is applied. The negative electrode includes a current collector on which a negative electrode mixture layer including a negative electrode active material is applied. The current collector of the positive electrode includes, for example, an aluminum foil. The current collector of the negative electrode includes, for example, a copper foil. The positive electrode mixture layer includes a positive electrode active material formed of a lithium-transition metal composite oxide such as $LiMn_2O_4$, a conductive auxiliary agent, and a binder, for example. The negative electrode mixture layer includes a negative electrode active material, a conductive auxiliary agent, and a binder, for example. Examples of the negative electrode active material include hard carbon (non-graphitizable carbon material), graphite-based carbon materials, and lithium-transition metal composite oxides.

The separator included in the electrode multilayer body 10 is a heat-resistant separator (hereinafter referred to as "separator" simply). The heat-resistant separator is formed of a material that is melted uneasily or contracts uneasily when heated. For example, the separator is formed of a material that does not deform due to softening at least at a temperature of 150° C. Examples of such a heat-resistant separator include a microporous film formed of a material including cross-linked resin. Here, the material including the cross-linked resin is not limited in particular. Examples of such a material include polypropylene. Other examples of the heat-resistant separator include a microporous film formed of a material including heat-resistant filler. Examples of the heat-resistant filler include inorganic particles of iron oxide, alumina ($Al_2O_3$), silica ($SiO_2$), and the like, and organic particles of polyimide, melamine resin, phenol resin, and the like.

As illustrated in FIG. 1, the package 20 includes two packaging films 21 and 22 that cover the electrode multilayer body 10 from both sides in the thickness direction. The packaging film 21 includes a cup portion 21a and a brim-like peripheral portion 21b (illustrated with oblique lines). The packaging film 22 includes a cup portion 22a and a brim-like peripheral portion 22b (illustrated with oblique lines). The packaging films 21 and 22 cover the electrode multilayer body 10 from both sides in the thickness direction. In this manner, the overlapping region between the packaging films 21 and 22 (hereinafter also referred to as "overlapping region of package 20") is formed around the electrode multilayer body 10. The overlapping region is a region where the peripheral portion 21b of the packaging film 21 overlaps with the peripheral portion 22b of the packaging film 22. The external shape of the overlapping region between the packaging films 21 and 22 is rectangular in plan view. The four sides of the rectangular shape each correspond to edges E1 to E4 (see FIG. 2). The cup portion 21a of the packaging film 21 and the cup portion 22a of the packaging film 22 are formed to define the space that covers the electrode multilayer body 10. The cup portions 21a and 22a can be formed by deep drawing molding.

The packaging films 21 and 22 can be formed of any material that has flexibility and that can seal the electrode multilayer body 10 allowing no leakage of the electrolyte solution. Typical examples of the layer structure of the packaging films 21 and 22 include a structure in which a heat-sealing resin layer and a metal layer are stacked, and a structure in which a heat-sealing resin layer, a metal layer, and a protective layer are stacked in this order. Examples of the protective layer include layers formed of a film of polyester such as polyethylene terephthalate or the like and formed of a film of nylon or the like.

Examples of the metal layer that can be employed include a foil of Al, Ti, Ti alloy, Fe, stainless steel, and Mg alloy. There is no particular limitation on the resin that can be used for the heat-sealing resin layer and any resin capable of heat sealing can be used. Examples of such resins include polypropylene, polyethylene, acid-modified polypropylene and polyethylene, polyethylene sulfide, polyethylene terephthalate, other polyesters, polyamide, and ethylene-vinyl acetate copolymer. A liquid electrolyte (electrolyte solution) is poured into the sealed package 20 housing the electrode multilayer body 10. The electrolyte solution includes an organic solvent and a supporting electrolyte and the like. Examples of the organic solvent include cyclic carbonates such as propylene carbonate (PC) and ethylene carbonate (EC), linear carbonate such as dimethyl carbonate, and ethers such as tetrahydrofuran. Examples of the supporting electrolyte include a negative ion salt of an inorganic acid, such as lithium salt ($LiPF_6$) and a negative ion salt of an organic acid, such as $LiCF_3SO_3$.

As described below, the packaging films 21 and 22 are overlapped so that the heat-sealing resin layers of the packaging films 21 and 22 face each other in the overlapping region between the packaging films 21 and 22 for the heat sealing. As illustrated in FIG. 2, a heat sealing region (illustrated with oblique lines in FIG. 2) is formed around the electrode multilayer body 10 for sealing the package 20 housing the electrode multilayer body 10 near the edges E1 to E4 corresponding to four sides of the rectangle as the external shape of the overlapping region between the packaging films 21 and 22. This sealing is performed by heat sealing of the heat-sealing resin layers of the packaging films 21 and 22. That is to say, the package 20 housing the electrode multilayer body 10 is sealed in the state that the positive electrode tab 12A and the negative electrode tab 12B project out of the package 20.

Next, the structure of the electrode multilayer body 10 is described with reference to FIG. 3. FIG. 3 is a sectional view illustrating the section along A-A of FIG. 2 with the heating head 51 for bonding the packaging films 21 and 22. The electrode multilayer body 10 illustrated in FIG. 3 includes negative electrodes 101-1 to 101-4, positive electrodes 102-1 to 102-3, and separators 110-1 to 110-6. That is to say, the electrode multilayer body 10 includes a plurality of positive electrodes and negative electrodes stacked with a plurality of separators interposed therebetween. The size of the separators included in the electrode multilayer body 10 according to this embodiment is not uniform. That is to say, the projecting amount of the end of each separator of the electrode multilayer body 10 is different. In the description of this embodiment, "the projecting amount of the end" of the separator is defined by the length of the part of the separator that projects outward beyond the outermost (i.e., the rightmost in FIG. 3) end of the negative electrode or the positive electrode out of the plurality of negative electrodes or the plurality of positive electrodes included in the electrode multilayer body 10. In the example illustrated in FIG. 3, the end of the negative electrodes 101-1 to 101-4 is positioned further outside than the end of the positive electrodes 102-1 to 102-3. The ends of the negative electrodes are on the same plane NP (i.e., the electrodes have the same size). In other words, the ends of these negative electrodes are positioned on the outermost side. Therefore, the length of the part of the separator that projects outward from the plane NP including the end of the negative electrode (the part on the right side relative to the plane NP in FIG. 3) corresponds to the projecting amount of the end of each separator.

The electrode multilayer body 10 includes the separators 110-1 and 110-6 whose projecting amount of the end is large, and the separators 110-2 and 110-5 whose projecting amount of the end is smaller than the separators 110-1 and 110-6 and which are positioned immediately inside these separators. Here, the separators 110-1 and 110-6 whose projecting amount of the end is larger correspond to one example of the first separator. Moreover, the separators 110-2 and 110-5 whose projecting amount of the end is smaller correspond to one example of the second separator.

The end of the separator 110-1 is in contact with an inner surface 21*i* of the packaging film 21. Thus, the end of the separator 110-1 forms a curved portion 110-1*a* that curves further inside (closer to the center of the electrode multilayer body 10 in the stacking direction) than a virtual extension plane (represented by VP in FIG. 3) of the outer surface of the separator 110-2. Here, the separator that is closest to the separator 110-1 among the plurality of separators included in the electrode multilayer body 10 is the separator 110-2. However, since the projecting amount of the end of the separator 110-2 is small, the end of the separator 110-2 does not interfere with the curved portion 110-1*a* of the separator 110-1.

The end of the separator 110-6 is similarly in contact with an inner surface 22*i* of the packaging film 22. Thus, the end of the separator 110-6 forms a curved portion 110-6*a* that curves further inside than a virtual extension plane (represented by VP in FIG. 3) of the outer surface of the separator 110-5. Here, the separator that is closest to the separator 110-6 among the plurality of separators included in the electrode multilayer body 10 is the separator 110-5. However, since the projecting amount of the end of the separator 110-5 is small, the end of the separator 110-5 does not interfere with the curved portion 110-6*a* of the separator 110-6.

Note that the projecting amount of the end of separator 110-2 in FIG. 3 is sufficiently small. Therefore, the end of the second separator 110-2 is not in contact with the inner surface of the first separator 110-1. In contrast to this, when the projecting amount of the end of the second separator 110-2 is larger, the end may be in contact with the inner surface of the first separator 110-1. Even in this case, however, the end of the second separator 110-2 does not apply pressure directly on the tip of the curved portion 110-1*a* of the first separator. Therefore, the contact pressure applied to the inner surface 21*i* of the packaging film 21 by the tip of the curved portion 110-1*a* of the first separator is not that large. In particular, even when the end of the second separator 110-2 is in contact with the inner surface of the first separator 110-1, the space can be formed on the virtual extension plane VP of the outer surface of the second separator 110-2 between the curved portion 110-1*a* of the first separator 110-1 and the inner surface 21*i* of the packaging film 21. In this case, the contact pressure applied to the inner surface 21*i* of the packaging film 21 by the tip of the curved portion 110-1*a* of the first separator is not that large. Similarly, when the projecting amount of the end of another second separator 110-5 is larger the projecting amount of the end illustrated in FIG. 3, the contact pressure applied to the inner surface 22*i* of the packaging film 22 by the tip of the curved portion 110-6*a* of the corresponding first separator is not that large.

(2) Fabrication Method for Battery in this Embodiment

Next, a fabrication method for the lithium ion secondary battery 1 in this embodiment is described.

(2-1) Step of Forming Overlapping Region Between Packaging Films

First, a plurality of positive electrodes and a plurality of negative electrodes are stacked alternately with each separator interposed therebetween, thereby forming the electrode multilayer body 10. The positive electrode lead 10A led out of the end of the plural positive electrode current collectors (where the positive electrode mixture layer is not formed) and the positive electrode tab 12A are collectively welded through ultrasonic welding. Similarly, the negative electrode lead 10B led out of the end of the plural negative electrode current collectors (where the negative electrode mixture layer is not formed) and the negative electrode tab 12B are collectively welded through ultrasonic welding. Next, the two packaging films 21 and 22 are overlapped on each other so as to cover the electrode multilayer body 10. In the example of this embodiment, the peripheral portion 21*b* of the packaging film 21 and the peripheral portion 22*b* of the packaging film 22 are overlapped on each other so that their heat-sealing resin layers face each other. Thus, the overlapping region is formed. On this occasion, as illustrated in FIG. 2, a part of each of the positive electrode tab 12A and a part of the negative electrode tab 12B project outward from any of the edges E1 to E4 of the packaging films 21 and 22 (in FIG. 2, the edge E4).

As illustrated in FIG. 3, the overlapping region is formed by the packaging films 21 and 22. Therefore, the packaging film 21 is inclined outward to the center in the stacking direction ranging from the cup portion 21*a* to the peripheral portion 21*b* included in the overlapping region. Thus, the end of the first separator 110-1 is in contact with the inclined area. The end of the first separator 110-1 is therefore curved along the inclination of the packaging film 21. This forms the curved portion 110-1*a*. The tip of the curved portion 110-1*a* is positioned further inside than the virtual extension plane VP of the outer surface of the second separator 110-2. That is to say, the curved portion 110-1*a* is curved further inside than the virtual extension plane VP. However, the curved portion 110-1*a* of the first separator 110-1 does not interfere with the end of the second separator 110-2 whose projecting amount of the end is small. For this reason, the contact pressure between the tip of the curved portion 110-1*a* of the first separator 110-1 and the inner surface 21*i* of the packaging film 21 is relatively small.

The packaging film 22 is similarly inclined outward to the center in the stacking direction ranging from the cup portion 22*a* to the peripheral portion 22*b* included in the overlapping region. Thus, the end of the separator 110-6 is in contact with the inclined area. The end of the first separator 110-6 is therefore curved along the inclination of the packaging film 22. This forms the curved portion 110-6*a*. The tip of the curved portion 110-6*a* is positioned further inside than the virtual extension plane VP of the outer surface of the second separator 110-5. That is to say, the curved portion 110-6*a* is curved further inside than the virtual extension plane VP.

However, the curved portion 110-6*a* of the first separator 110-6 does not interfere with the end of the second separator 110-5 whose projecting amount of the end is small. For this reason, the contact pressure between the tip of the curved portion 110-6*a* of the first separator 110-6 and the inner surface 22*i* of the packaging film 22 is relatively small.

(2-2) Step of Bonding Packaging Films

Next, description is made of a step of bonding the packaging films in the fabrication of the battery according to this embodiment with reference to FIG. 3. In FIG. 3, as an example, a part of the overlapping region of the package 20 formed around the electrode multilayer body 10 that includes the edge E2 is provided with a heat sealed region S2.

As illustrated in FIG. 3, the heating apparatus includes the heating head 51 including a first heating head 51A and a second heating head 51B. The first heating head 51A is provided immediately above the peripheral portion 21*b* of the packaging film 21. The second heating head 51B is provided immediately below the peripheral portion 22*b* of the packaging film 22. For example, the end of the package 20 is positioned so that the outer ends of the first heating head 51A and the second heating head 51B coincide with the edge E2 of the package 20. For enabling this positioning, first, the position of the end of the package 20 to be bonded is specified through image processing. A grip member (not shown) for gripping the package 20 is moved by an actuator so that the outer ends of the heating heads 51A and 51B coincide with the specified position. In this manner, the positioning of the heating heads is carried out.

As described above, each of the packaging films 21 and 22 has, for example, a stack of the heat-sealing resin layer, the metal layer as the barrier layer, and the protective layer. In the overlapping region of the package 20, the packaging films 21 and 22 are overlapped on each other so that their inner surfaces (i.e., heat-sealing resin layers) are in contact with each other. In the case of heat sealing the packaging films 21 and 22, the first heating head 51A is brought into contact with the outer surface (protective layer) of the packaging film 21. Along with this, the second heating head MB is also brought into contact with the outer surface (protective layer) of the packaging film 22. In other words, the packaging films 21 and 22 are held from both sides between the first heating head MA and the second heating head MB. In a part of the overlapping region between the packaging films 21 and 22, the inner surface 21*i* (heat-sealing resin layer) of the packaging film 21 and the inner surface 22*i* (heat-sealing resin layer) of the packaging film 22 are heat sealed to each other. As a result, the heat seal layer where the inner surfaces 21*i* and 22*i* are integrated is formed. The region where the heat seal layer is formed corresponds to the heat sealed region S2 in a plan view of FIG. 2.

The description has been made of the example with reference to FIG. 3 in which the heat sealed region S2 is formed along the part of the overlapping region of the package 20 formed around the electrode multilayer body 10 that includes the edge E2. The ends of the package 20 corresponding to the sides of the electrode multilayer body 10 can be similarly heat sealed using the heating apparatus.

Specifically, in the bonding step, the side (i.e., the edge E4) with the positive electrode tab 12A and the negative electrode tab 12B projecting from the package 20 out of the four sides of the package 20 corresponding to the four sides of the electrode multilayer body 10 is first heat sealed using the heating apparatus. Thus, a heat sealed region S4 is formed. Next, the side (i.e., the edge E2) opposite to the side with the positive electrode tab 12A and the negative electrode tab 12B projecting from the package 20 out of the four sides of the package 20 is heat sealed similarly, so that the heat sealed region S2 is formed. Furthermore, the edge E3 of the package 20 is heat sealed similarly, so that a heat sealed region S3 is formed. By sealing the edges E2 to E4 of the package 20, the package 20 forms a bag-shaped body with the open edge E1.

(2-3) Step of Pouring Electrolyte Solution

Next, the electrolyte solution is poured into the bag-shaped package 20 through the edge E1 of the package 20. How to pour the electrolyte solution is not particularly limited. The solution can be poured in a manner that the solution is directly poured through a tube or a nozzle inserted from the edge E1 into the bag-shaped package 20 or the solution is poured into the package 20 by having the bag-shaped package 20 immersed in an electrolyte tank.

(2-4) Step of Sealing

After the electrolyte solution is poured, the overlapping region including the edge (i.e., E1) of the package 20 corresponding to the left one side of the electrode multilayer body 10 is heat sealed, thereby forming a heat sealed region S1. Thus, the package 20 is sealed around the electrode multilayer body 10. In this manner, the lithium ion secondary battery 1 including the package 20 filled with the electrolyte solution is obtained.

In the aforementioned steps of bonding and sealing, the bonded layer is formed by heating the overlapping region between the packaging films 21 and 22 including the end of the package 20 corresponding to each side around the electrode multilayer body 10 with the use of the heating apparatus (heating head 51 in FIG. 3). On this occasion, not just the overlapping region but also the portion of the packaging films 21 and 22 near the overlapping region has the high temperature by the heating head 51. For example, in FIG. 3, the area of the packaging film 21 inclined from the cup portion 21a to the peripheral portion 21b also has the high temperature. Therefore, the heat-sealing resin layer included in the inner surface 21i in that area is softened. Similarly, the area of the packaging film 22 inclined from the cup portion 22a to the peripheral portion 22b has the high temperature. Therefore, the heat-sealing resin layer included in the inner surface 22i in that area is softened.

Here, the separator included in the electrode multilayer body 10 is the heat-resistant separator. The heat-resistant separator is formed of the material that is uneasily softened under the heat from the inner surface 22i of the packaging film 22 having the high temperature. As described above, however, the contact pressure between the tip of the curved portion 110-1a of the first separator 110-1 and the inner surface 21i of the packaging film 21 and the contact pressure between the tip of the curved portion 110-6a of the first separator 110-6 and the inner surface 22i of the packaging film 22 are small. This can suppress that the tip of the curved portions 110-1a and 110-6a of the first separator with the heat resistance enters the softened heat-sealing resin layers of the packaging films 21 and 22.

(3) Comparative Example

Next, a lithium ion secondary battery, which has a structure different from the lithium ion secondary battery 1 according to the embodiment, is described as a comparative example with reference to FIG. 4. FIG. 4 is a sectional view of the lithium ion secondary battery according to the comparative example, which corresponds to the cross section in FIG. 3. In FIG. 4, the same component as that of the lithium ion secondary battery 1 in the embodiment illustrated in FIG. 3 is denoted by the same reference symbol. The description to the same component is omitted.

The projecting amounts of the ends of separators 210-1 to 210-6 stacked in an electrode multilayer body 15 are uniform in the lithium ion secondary battery according to the comparative example, which is different from the lithium ion secondary battery 1 of this embodiment. Therefore, even if the end of the separator in contact with the packaging film is curved toward the center in the stacking direction, the tip of the curved portion does not come to the position further inside than the outer surface of another separator positioned further inside than that separator.

Specifically, as illustrated in FIG. 4, when the overlapping region between the packaging films 21 and 22 is formed, the packaging film 21 is inclined outward to the center in the stacking direction ranging from the cup portion 21a to the peripheral portion 21b included in the overlapping region. Therefore, the end of the separator 210-1 is in contact with the inner surface 21i of the packaging film 21 corresponding to the inclined area. Thus, the end of the separator 210-1 is curved inward along the inclination of the packaging film 21. Thus, the curved portion 210-1a is formed. Here, the curved portion 210-1a of the separator 210-1 interferes with the end of the separator 210-2. Therefore, the curved portion 210-1a of the separator cannot be curved further inside than an outer surface PP of the separator 210-2. On this occasion, the separator 210-1 is held between the inner surface 21i of the packaging film 21 and the outer surface PP of the separator 210-2. Therefore, the contact pressure between the tip of the curved portion 210-1a of the separator 210-1 and the inner surface 21i of the packaging film 21 is relatively large.

The end of the separator 210-6 is similarly curved inward along the inclination of the packaging film 22. Thus, the curved portion 210-6a is formed. Here, the curved portion 210-6a of the separator 210-6 interferes with the end of the separator 210-5. Therefore, the curved portion 210-6a of the separator cannot be curved further inside than an outer surface PP of the separator 210-5. On this occasion, the separator 210-6 is held between the inner surface 22i of the packaging film 22 and the outer surface PP of the separator 210-5. Therefore, the contact pressure between the tip of the curved portion 210-6a of the separator 210-6 and the inner surface 22i of the packaging film 22 is relatively large.

In the case of heating, with the use of the heating apparatus (heating head 51 in FIG. 4), the overlapping region between the packaging films 21 and 22 including the end of the package 20 corresponding to each side of the electrode multilayer body 15 of the lithium ion secondary battery according to the comparative example around the electrode multilayer body 15, the portion of the packaging films 21 and 22 near the overlapping region also has the high temperature as described above. In other words, in FIG. 4, the area of the packaging film 21 inclined from the cup portion 21a to the peripheral portion 21b and the area of the packaging film 22 inclined from the cup portion 22a to the peripheral portion 22b have the high temperature.

Here, in the lithium ion secondary battery according to the comparative example, the contact pressure between the tip of the curved portion 210-1a of the separator 210-1 and the inner surface 21i of the packaging film 21 and the contact pressure between the tip of the curved portion 210-6a of the separator 210-6 and the inner surface 22i of the packaging film 22 are large. Therefore, it possibly occurs that the tip of the curved portions 210-1a and 210-6a of the separators enters the heat-sealing resin layers of the packaging films 21 and 22 that are softened in the steps of bonding and sealing (see the portion E in FIG. 4). In particular, in the case where the separator included in the electrode multilayer body 15 has the heat resistance, the separator is uneasily softened even under the heat from the inner surface 22i of the packaging film 22 having the high temperature. Thus, it occurs more easily that the tip of the curved portions 210-1a and 210-6a of the separator enters the heat-sealing resin layers of the packaging films 21 and 22. If the tip of the curved portions 210-1a and 210-6a of the separators has reached the respective metal layers of the packaging films 21 and 22, the insulating property of the metal layers in the packaging film may be lost. This may prevent the lithium ion secondary battery from delivering the desired performance. The contact pressure in the lithium ion secondary battery according to the comparative example can be suppressed when the packaging film with higher capacity is employed. However, this is not preferable because the battery is increased in size.

It is suppressed that the separator with the heat resistance enters the heat-sealing resin layers of the packaging films 21 and 22 softened in the steps of bonding and sealing in the lithium ion secondary battery 1 according to the embodiment, which is different from the lithium ion secondary battery according to the comparative example. Therefore, the battery can deliver the desired performance while suppressing the size increase of the battery.

(4) Modified Examples (4-1) First Modified Example

Figure 5:
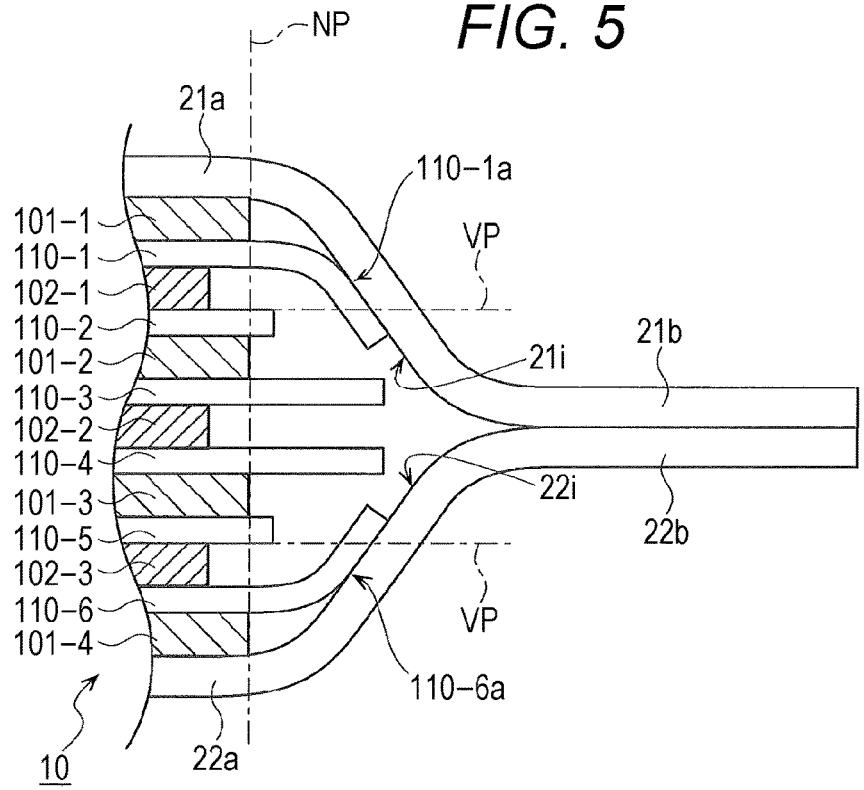
FIG. 5 is a sectional view of a lithium ion secondary battery according to a first modified example of the embodiment, which corresponds to the cross section in FIG. 3.

As illustrated in FIG. 5, the end of the first separator 110-1 in contact with the inner surface 21i of the packaging film 21 is preferably in plane contact with the inner surface 21i in the lithium ion secondary battery 1 according to this embodiment. Similarly, the end of another first separator 110-6 in contact with the inner surface 22i of the packaging film 22 is preferably in plane contact with the inner surface 22i. This can further reduce the contact pressure between the tip of the curved portion 110-1a of the first separator 110-1 and the inner surface 21i of the packaging film 21 and the contact pressure between the tip of the curved portion 110-6a of the first separator 110-6 and the inner surface 22i of the packaging film 22. Thus, it can be further suppressed that the tips of the curved portions 110-1a and 110-6a of the first separator enters the heat-sealing resin layers of the softened packaging films 21 and 22. Note that the projecting amount of each end of the first separators 110-1 and 110-6 may be adjusted as appropriate in order to have the ends of the first separators 110-1 and 110-6 in plane contact with the inner surfaces 21i and 22i of the packaging films 21 and 22.

(4-2) Second Modified Example

Figure 6:
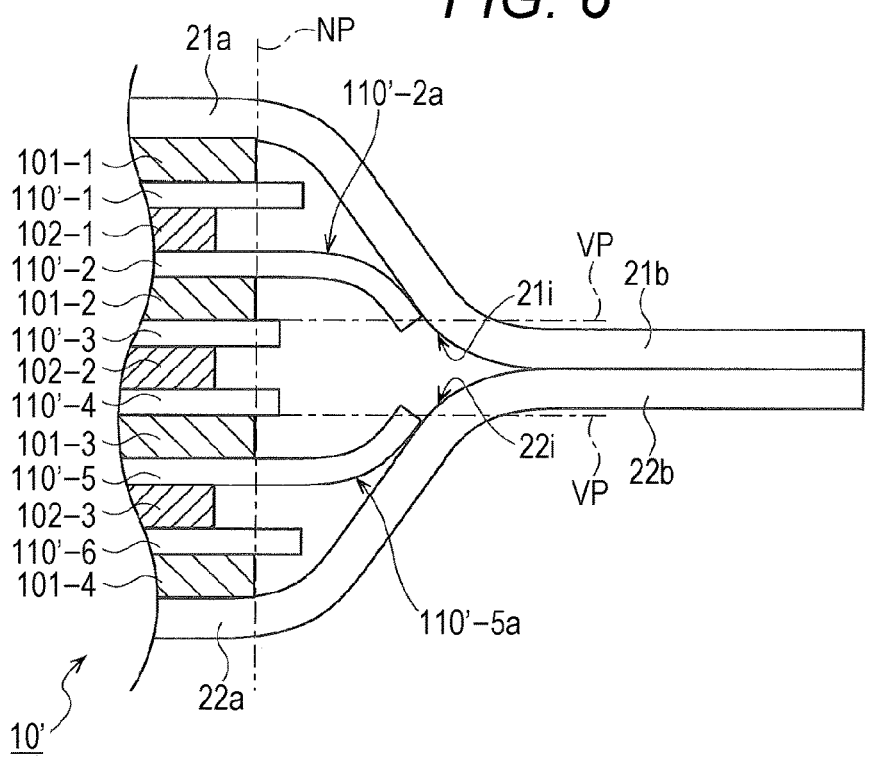
FIG. 6 is a sectional view of a lithium ion secondary battery according to a second modified example of the embodiment, which corresponds to the cross section in FIG. 3.

The description has been made with reference to the examples illustrated in FIGS. 3 and 5. In this description, the ends of the separators (first separators 110-1 and 110-6 in FIG. 3) at the farthest position from the center in the stacking direction among the plural separators stacked in the electrode multilayer body are each in contact with the inner surface of the packaging films 21 and 22. The lithium ion secondary battery according to the embodiment is, however, not limited to these examples. FIG. 6 illustrates an electrode multilayer body 10' with a separator structure different from that of FIG. 3 used in the above embodiment. In the electrode multilayer body 10' illustrated in FIG. 6, the ends of separators 110'-1 and 110'-6 at the farthest position in the stacking direction are not in contact with the inner surfaces 21i and 22i of the packaging films 21 and 22 respectively. Each of separators 110'-2 and 110'-5 whose projecting amount of the end is large in FIG. 6 correspond to an example of the first separator. Each of separators 110'-3 and 110'-4 whose projecting amount of the end is small in FIG. 6 correspond to an example of the second separator.

The end of the first separator 110'-2 is in contact with the inner surface 21i of the packaging film 21. Thus, a curved portion 110'-2a that is curved further inside than the virtual extension plane (represented by VP in FIG. 6) of the outer surface of the second separator 110'-3 is formed. Here, the second separator 110'-3 is positioned at the position closest to the first separator 110'-2 among the plural separators included in the electrode multilayer body 10'. However, since the projecting amount of the end is small, the end of the second separator 110'-3 does not interfere with the curved portion 110'-2a of the first separator 110'-2.

The end of the first separator 110'-5 is similarly in contact with the inner surface 22i of the packaging film 22. Thus, a curved portion 110'-5a that is curved further inside than the virtual extension plane (represented by VP in FIG. 6) of the outer surface of the second separator 110'-4 is formed. Here, the second separator 110'-4 is positioned at the position closest to the first separator 110'-5 among the plural separators included in the electrode multilayer body 10'. However, since the projecting amount of the end is small, the end of the second separator 110'-4 does not interfere with the curved portion 110'-5a of the first separator 110'-5.

In the steps of bonding and sealing of the separator with the structure illustrated in FIG. 6, it can be suppressed that the separator with the heat resistance enters the heat-sealing resin layers of the softened packaging films 21 and 22, which is similar to the case of the above embodiment.

(4-3) Third Modified Example

Figure 7:
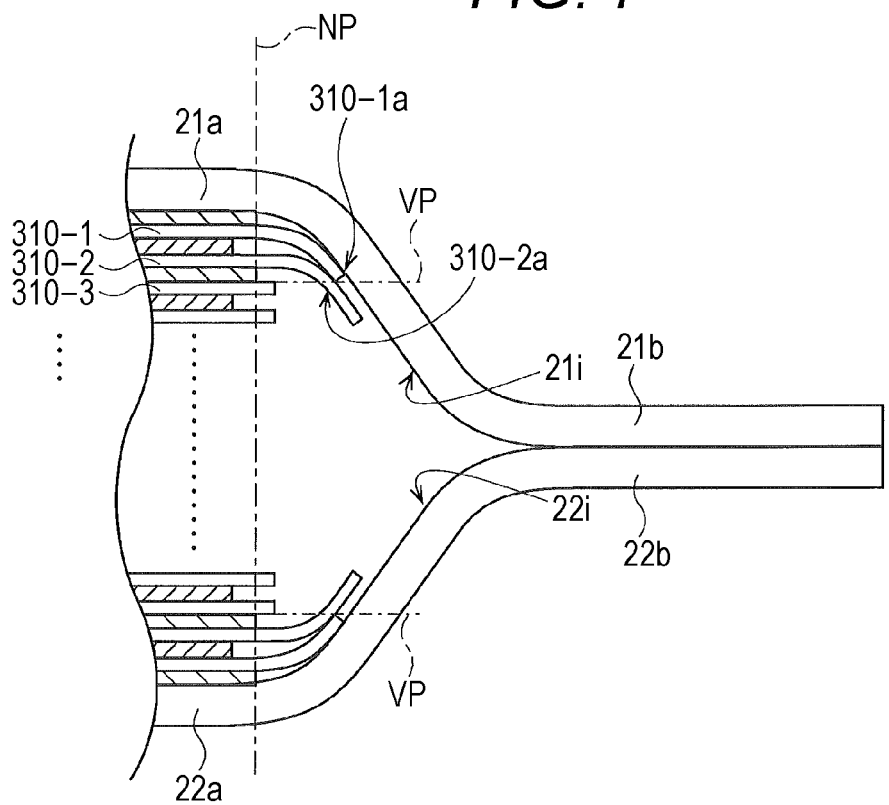
FIG. 7 is a sectional view of a lithium ion secondary battery according to a third modified example of the embodiment, which corresponds to the cross section in FIG. 3.

In the above embodiment and the modified examples, the ends of the first separators (in FIG. 3, separators 110-1 and 110-6) are each in contact with the inner surfaces 21i and 22i of the packaging films 21 and 22. However, the end of the first separator is not necessarily in contact with the inner surface of the packaging film. For example, the end of the first separator may be in contact with the inner surface of the separator located immediately outside the first separator. This case is illustrated in FIG. 7. FIG. 7 is a sectional view of the third modified example of the lithium ion secondary battery according to the embodiment, which corresponds to the cross section in FIG. 3. In the electrode multilayer body of the lithium ion secondary battery illustrated in FIG. 7, separators 310-1, 310-2, 310-3, . . . are stacked in this order and the separator 310-1 is the outermost separator. The projecting amount of each end of the separators 310-1 and 310-2 is large, and that of the separator 310-3 is small. Here, the end of the separator 310-1 is in contact with the inner surface 21i of the packaging film 21. The end of the separator 310-2 is in contact with the inner surface of the separator 310-1 (surface closer to the center in the stacking direction). The end of the separator 310-1 and the end of the separator 310-2 are curved inward as a whole along the inclination of the inner surface 21i of the packaging film 21, so that curved portions 310-1a and 310-2a are formed. On this occasion, the curved portion 310-2a of the separator 310-2 as the first separator is curved further inside than the virtual extension plane (represented by VP) of the outer surface of the separator 310-3 as the second separator. Here, the separator 310-1 is an example of the separator located immediately outside the first separator. In the example illustrated in FIG. 7, the separator 310-1 is held between the first separator 310-2 and the inner surface 21i of the packaging film 21. The electrode multilayer body according to the third modified example is structured so that the curved portion 310-2a of the first separator can freely be curved inward without interfering with the end of another separator. Thus, the contact pressure of the tip of the curved portion 310-1a of the separator 310-1 relative to the inner surface 21i of the packaging film 21 is suppressed. For reducing the contact pressure, in FIG. 7, the end of the separator 310-1 is preferably in plane contact with the inner surface 21i of the packaging film 21 and the end of the first separator 310-2 is preferably in plane contact with the inner surface of the separator 310-1. In FIG. 7, two separators whose projecting amount of each end is large and which each form the curved portion are shown as the example; however, the modified examples of the embodiment are not limited to this example. Three or more of such separators whose projecting amount of each end is large and which each form the curved portion may be included.

The lithium ion secondary battery according to the embodiment of the present disclosure may be any of the following first and second lithium ion secondary batteries.

The first lithium ion secondary battery includes: an electrode multilayer body in which a plurality of positive electrodes and a plurality of negative electrodes are stacked with a heat-resistant separators interposed therebetween and an end of the separator projects out of the positive electrode and the negative electrode; and a package including a packaging film that covers the electrode multilayer body from both sides in a stacking direction, the package including a region for sealing the electrode multilayer body by the packaging film around the electrode multilayer body. The plurality of separators stacked in the electrode multilayer body includes a first separator whose projecting amount of an end is large, and a second separator which is disposed further inside than the first separator and whose projecting amount of an end is smaller than that of the first separator. The end of the first separator has a curved portion that is in contact with an inner surface of the packaging film or an inner surface of the separator that is positioned further outside than the first separator and is therefore curved further inside than a virtual extension plane of a major surface of the second separator that is on the first separator side.

In the second lithium ion secondary battery according to the first lithium ion secondary battery, the curved portion is in plane contact with the inner surface of the packaging film or the inner surface of the separator that is positioned further outside than the first separator.

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. A lithium ion secondary battery comprising:
an electrode multilayer body including a plurality of positive electrodes and negative electrodes stacked with a plurality of heat-resistant separators interposed therebetween, the heat-resistant separators comprising at least one of a cross-linked resin and a heat-resistant filler; and
a package including a packaging film that has an inner surface with a heat-sealing layer and covers the electrode multilayer body from both sides in a stacking direction, wherein
the package comprises:
a preformed cup region that is a space that covers the electrode multilayer body; and
a sealing region sealing the package, the sealing region being on the packaging film extending past the preformed cup region, and being formed by heat-sealing overlapped heat-sealing layers in contact with each other,
an inclined region that is inclined in a stacking direction, the inclined region ranging from the preformed cup region to the sealing region,
wherein an end of each of the plurality of heat-resistant separators projects from each of the plurality of positive electrodes and negative electrodes,
wherein the plurality of heat-resistant separators includes a first heat-resistant separator, and a second heat-resistant separator which is disposed inside the first heat-resistant separator and whose projecting amount of an end is smaller than that of the first heat-resistant separator,
wherein the end of the first heat-resistant separator is in unbonded contact with an inner surface of the packaging film, the end of the first heat-resistant separator including a curved portion that is curved further inside than a virtual extension plane of an outer surface of the second heat-resistant separator,
wherein a tip of the end of the first heat-resistant separator is in contact with the inclined region, and the end of the first heat-resistant separator is curved along an inclination of the inclined region,
wherein ends of the second heat-resisting separator that are smaller than that of the first heat-resistant separator are located at an unbonded end of the first and second heat resistant separators, and
wherein a tip of the second heat-resistant separator is positioned further away from the sealing region than the tip of the end of the first heat-resistant separator is positioned so that the tip of the end of the first heat-resistant separator does not interfere with the second heat-resistant separator.

2. The lithium ion secondary battery according to claim 1, wherein the end of the first heat-resistant separator is in plane contact with the inner surface of the packaging film.

3. The lithium ion secondary battery according to claim 1, wherein the plurality of heat-resistant separators resist deforming due to softening at temperatures less than or equal to a heat-sealing temperature of the heat-sealing layer of the packaging film.

4. The lithium ion secondary battery according to claim 1, wherein the plurality of heat-resistant separators resist deforming due to softening at temperatures less than or equal to 150° C.

* * * * *